Nov. 5, 1940.　　　　　E. W. ROUCH　　　　　2,220,829
FLUID PRESSURE ACTUATED MOTOR
Filed May 4, 1939
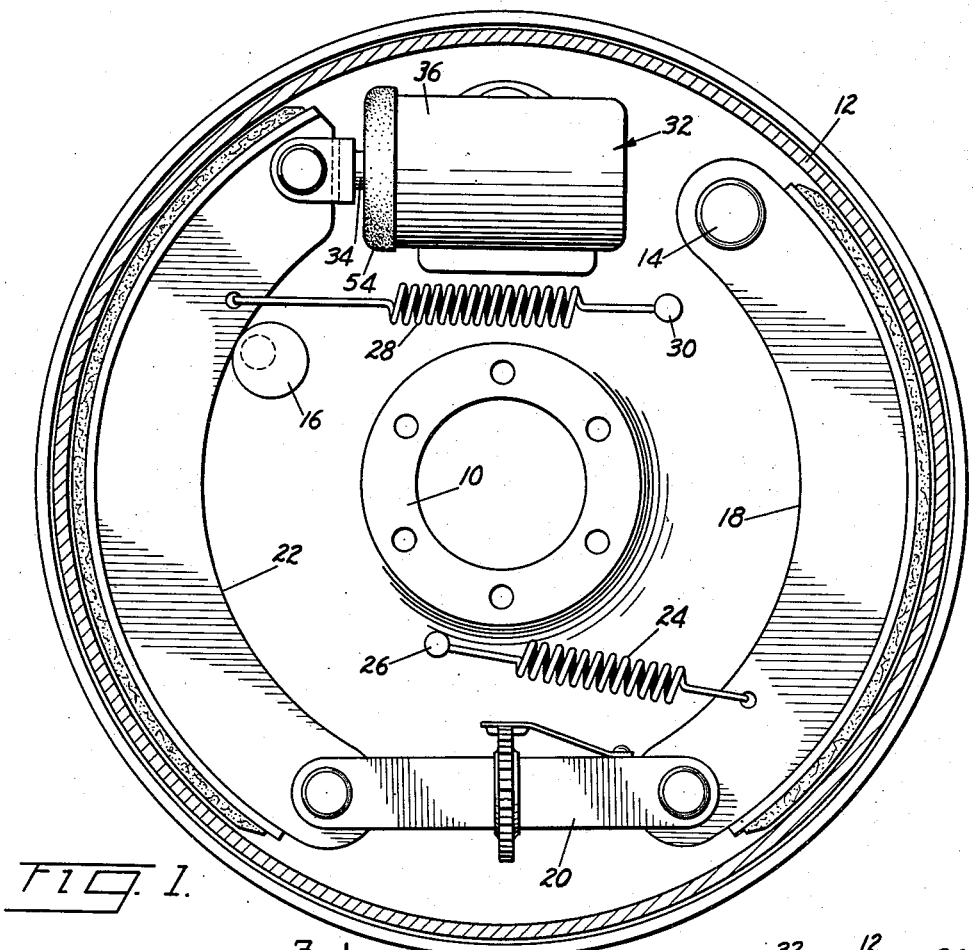
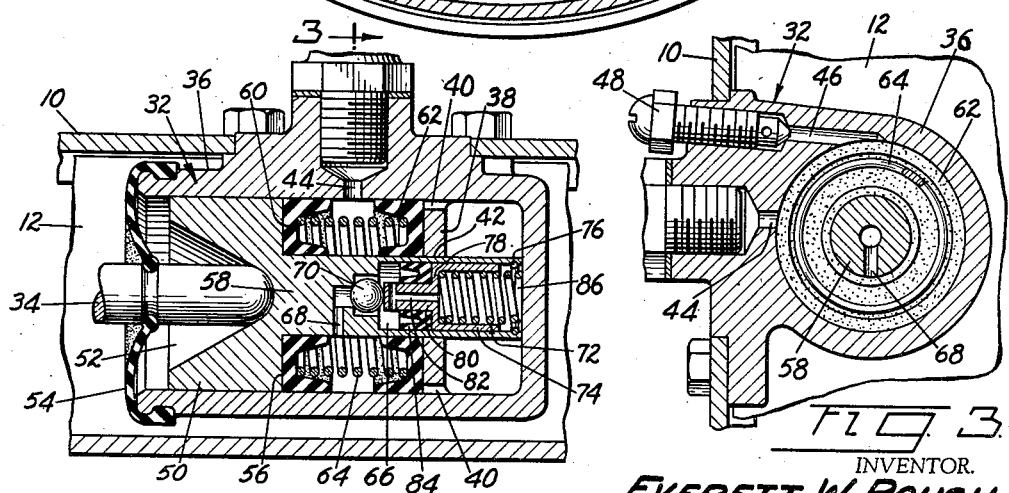
INVENTOR.
EVERETT W. ROUCH
BY
ATTORNEY.

Patented Nov. 5, 1940

2,220,829

UNITED STATES PATENT OFFICE 2,220,829

FLUID PRESSURE ACTUATED MOTOR

Everett W. Rouch, Detroit, Mich., assignor to Hydraulic Brake Company, Detroit, Mich., a corporation of California Application May 4, 1939, Serial No. 271,810

3 Claims. (Cl. 60—54.6)

This invention relates to brakes, and more particularly to fluid pressure actuated motors therefor.

Broadly the invention comprehends a fluid pressure actuated motor of the two-phase type operative to increase pressure without proportionately increasing the applied operating force.

An object of the invention is to provide a remotely controlled fluid pressure actuated motor operative in two phases.

Another object of the invention is to provide a fluid pressure actuated motor for a brake operative in two phases so that the friction elements of the brake may be moved into engagement with an associated drum during the first phase and applied with increased force during the second phase.

Yet another object of the invention is to provide a fluid pressure actuated motor of the two phase type wherein the transition from low to a relatively high pressure is effected upon attaining a predetermined pressure in the motor.

Other objects of the invention will appear from the following description taken in connection with the drawing forming a part of this specification, and in which—

Fig. 1 is a vertical sectional view of a brake embodying the invention;

Fig. 2 is a longitudinal sectional view of the fluid pressure actuated motor; and Fig. 3 is a cross-sectional view of the motor taken substantially on line 3—3, looking in the direction indicated.

Referring to the drawing for more specific details of the invention, 10 represents a fixed support or backing plate adapted to be secured to an axle or to an axle housing. Associated with the backing plate is a rotatable drum 12 adapted to be secured to a wheel, and suitably arranged on the backing plate within the drum is a fixed anchor 14 and a conventional adjustable retractile stop 16.

A friction element or shoe 18 is pivotally mounted on the anchor 14 for cooperation with the drum 12. The shoe 18 has connected thereto as by an adjustable link 20 another friction element or shoe 22. The shoe 18 is connected by a spring 24 to a fixed support 26, and the shoe 22 is connected by a spring 28 to a fixed support 30. The springs serve to return the shoes to retracted position upon conclusion of a braking operation and to retain the shoe 22 against the stop 16 when in the retracted position.

A fluid pressure actuated motor 32 of the compound type is mounted on the backing plate 10 and connected as by a thrust rod 34 to the shoe 22. The motor includes a cylinder 36 closed at one end as by a head and open at its other end. The cylinder has therein a partition 38 provided with a plurality of spaced passages 40 therethrough and a concentric aperture 42, and arranged in the wall of the cylinder is a fluid inlet 44, adapted to be connected to a suitable source of fluid pressure, and a bleeder port 46 normally closed as by a bleeder screw 48.

A piston 50 reciprocable in the cylinder 36 has in its back a recess 52 for the reception of the thrust rod 34, and a shield 54 sleeved on the rod embraces the open end of the cylinder for the exclusion of dust and other foreign substances. The piston has on its head 56 a concentric extension 58 extended through the aperture 42 in the partition 38 and normally seated on the head of the cylinder. A sealing cup 60 sleeved on the extension and seated on the head 56 guards against seepage of fluid from the cylinder past the piston. A corresponding sealing cup 62 sleeved on the extension and seated on the partition 38 controls the passages 40 through the partition, and a spring 64 interposed between the sealing cups serves to retain the cups against displacement.

The free end of the extension 58 is bored to form a chamber 66 and a passage 68 providing a communication between the chamber 66 and cylinder. A ball valve 70 controls the passage 68, and a piston 72 reciprocable in the chamber 66 normally retains the ball valve on its seat. The piston 72 includes a shell 74 retained in the chamber 66 as by a retaining ring 76 seated in a groove in the wall of the chamber. The shell has on its head 78 an extension 80 bored to form a passage 82 therethrough providing a communication between the shell and that portion of the chamber 66 forward of the piston 72. A sealing cup 84 sleeved on the extension and seated on the head 78 of the piston 72 guards against seepage of fluid past the piston, and a spring 86 interposed between the back of the head 72 of the piston and the head of the cylinder urges the piston against the ball valve 70.

In a normal operation, when fluid under pressure enters the cylinder 36, the piston 50 moves on its compression stroke. During the initial movement of the piston 50, a partial vacuum is created in the chamber back of the partition 38 due to a slight withdrawal of the extension 58 on the piston. However, because of the small mass of the extension constituting the wall of the chamber 76, the small mass constituting the skirt of the piston 72 and the small movement of these parts, the vacuum created is minute and does not materially effect the operation of the motor. This actuation of the piston 50 moves the shoe 22 into engagement with the drum 12. As the shoe engages the drum, friction is introduced between the shoe and the drum, and this results in slight movement of the shoe and transmission of force therefrom through the adjustable link 20 to the shoe 18, causing actuation of this shoe into engagement with the drum.

When the pressure on the fluid in the cylinder 36 reaches a predetermined magnitude, the ball valve 70 cracks and admits fluid through the passage 82 and the shell of the piston into that portion of the cylinder 36 between the head of the cylinder and the partition. The pressure on the fluid is now received on the entire area of the head of the piston 50, and hence is increased proportionately to the difference between the total area, and the total area less the cross-sectional area of the extension 58.

Upon completion of a braking operation and release of pressure in the cylinder 36, the piston 50 is returned to its retracted position under the influence of the retractile spring 28. As the piston 50 returns to its retracted position, fluid in the cylinder between the piston and the partition is displaced therefrom through the inlet port 44, and concomitantly with this operation the valve 70 closes, and a very small volume of the fluid in the cylinder between the partition 38 and the head of the cylinder is displaced therefrom, as the extension 58 moves to its seat on the head, through the passages 40 in the partition, past the sealing cup 60, into the chamber between the piston and the partition, thence through the inlet port 44. The fluid returned through the inlet port 44 enters the fluid pressure delivery line of the fluid pressure braking system, which may be of any preferred type.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure actuated motor comprising a cylinder closed at one end and open at its other end, an orificed partition in the cylinder having passages therethrough, a piston reciprocable in the open end of the cylinder having an extension slidable in the orifice, a sealing cup on the piston, an opposed sealing cup on the diaphragm controlling the passages, a chamber in the extension communicating with the cylinder on both sides of the partition, and a valve in the chamber controlling the communications.

2. A fluid pressure actuated motor comprising a cylinder closed at one end and open at its other end, a partition in the closed end of the cylinder having an axial orifice and spaced passages therethrough, a piston reciprocable in the open end of the cylinder having a concentric extension slidable in the orifice, a sealing cup on the head of the piston, an opposed collapsible sealing cup on the partition controlling the passages, a chamber in the extension communicating with the cylinder on both sides of the partition, and a fluid pressure actuated valve in the chamber controlling the communication.

3. A fluid pressure actuated motor comprising a cylinder closed at one end and open at its other end and provided with a port in its wall, a partition in the cylinder between the port and the closed end of the cylinder having an axial orifice and spaced passages therethrough, a piston reciprocable in the open end of the cylinder having an extension slidable in the orifice, a sealing cup on the piston, a sealing cup on the partition, a spring interposed between the cups, a chamber in the extension communicating with the cylinder on both sides of the partition, a valve in the chamber for control of the communications, a piston in the chamber having a passage therethrough, and a spring for urging the piston against the valve.

EVERETT W. ROUCH.